(12) United States Patent
Synnestvedt

(10) Patent No.: US 7,376,742 B1
(45) Date of Patent: May 20, 2008

(54) RESOURCE AND AAA SERVICE DEVICE

(75) Inventor: Robert Glenn Synnestvedt, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 621 days.

(21) Appl. No.: 10/104,817

(22) Filed: Mar. 22, 2002

(51) Int. Cl.
*G06F 15/16* (2006.01)
*G06F 12/01* (2006.01)

(52) U.S. Cl. ............... 709/229; 709/227; 709/245; 370/395.2

(58) Field of Classification Search ......... 370/231, 370/351, 352, 468, 395.2; 379/201.01; 455/560; 709/223–226, 201, 203, 204–207, 238–244, 709/229, 245, 202, 217, 218, 219, 227; 710/39, 710/40
See application file for complete search history.

(56) References Cited

U.S. PATENT DOCUMENTS

| | | | |
|---|---|---|---|
| 4,694,487 A | 9/1987 | Chang et al. | |
| 6,108,306 A | 8/2000 | Kalkunte et al. | |
| 6,151,688 A | 11/2000 | Wipfel et al. | |
| 6,185,288 B1 | 2/2001 | Wong | |
| 6,262,984 B1 | 7/2001 | Rochberger | |
| 6,279,054 B1 | 8/2001 | Boyle | |
| 6,324,264 B1 | 11/2001 | Wiener et al. | |
| 6,363,065 B1 | 3/2002 | Thornton et al. | |
| 6,370,151 B1 | 4/2002 | Bojanic | |
| 6,411,601 B1 | 6/2002 | Shaffer et al. | |
| 6,490,344 B1 | 12/2002 | Murai et al. | |
| 6,513,060 B1 | 1/2003 | Nixon et al. | |
| 6,556,659 B1 | 4/2003 | Bowman-Amuah | |
| 6,584,093 B1 | 6/2003 | Salama et al. | |
| 6,584,529 B1 | 6/2003 | Thomas | |
| 6,625,645 B1 | 9/2003 | Van Horne et al. | |
| 6,625,651 B1 | 9/2003 | Swartz et al. | |
| 6,629,149 B1 * | 9/2003 | Fraser et al. | 709/245 |
| 6,654,366 B1 | 11/2003 | Ketcham | |
| 6,665,714 B1 * | 12/2003 | Blumenau et al. | 709/222 |
| 6,714,515 B1 * | 3/2004 | Marchand | 370/231 |
| 6,765,903 B1 | 7/2004 | Allen et al. | |
| 6,798,771 B1 | 9/2004 | Low et al. | |
| 6,798,786 B1 | 9/2004 | Lo et al. | |
| 6,856,676 B1 * | 2/2005 | Pirot et al. | 379/201.01 |
| 6,862,626 B1 | 3/2005 | Ryu | |
| 6,883,033 B2 | 4/2005 | Maruyama et al. | |
| 6,909,711 B1 | 6/2005 | Noguchi | |

(Continued)

OTHER PUBLICATIONS

Khalil et al., Implementation of a Bandwidth Broker for Dynamic End-to-End Resource Reservation in Outsourced Virtual Private Network, Local Computer Networks, 2000, LCN 2000, Proceedings, 25th Annual IEEE Conference on Nov. 8-10, 2000, pp. 511-519.*

*Primary Examiner*—Zarni Maung
(74) *Attorney, Agent, or Firm*—Marger Johnson & McCollom, PC

(57) ABSTRACT

A network device. The network device includes a gateway switch to receive an incoming call and to identify a source of the call. A parser then receives a request associated with the incoming call and produces a parsed request. A message parser within the parser receives the request depending upon the source of the call. A policy switch then receives the parsed message and transmits the request to a policy processor based upon the parsed message.

20 Claims, 4 Drawing Sheets

U.S. PATENT DOCUMENTS

| | | |
|---|---|---|
| 6,952,728 B1 * | 10/2005 | Alles et al. .................. 709/224 |
| 6,961,857 B1 | 11/2005 | Floryanzia |
| 6,980,515 B1 | 12/2005 | Schunk et al. |
| 7,075,922 B2 | 7/2006 | Mussman et al. |
| 7,173,910 B2 | 2/2007 | Goodman |
| 7,209,473 B1 | 4/2007 | Mohaban et al. |
| 2001/0047333 A1 | 11/2001 | Kim et al. |
| 2002/0075844 A1 * | 6/2002 | Hagen ........................ 370/351 |
| 2002/0078119 A1 | 6/2002 | Brenner et al. |
| 2002/0085569 A1 | 7/2002 | Inoue |
| 2002/0089985 A1 | 7/2002 | Wahl et al. |
| 2002/0091854 A1 | 7/2002 | Smith |
| 2002/0102999 A1 | 8/2002 | Maggenti et al. |
| 2002/0103895 A1 | 8/2002 | Chiang |
| 2002/0107952 A1 | 8/2002 | Mancusi et al. |
| 2002/0122417 A1 | 9/2002 | Miller et al. |
| 2002/0160811 A1 * | 10/2002 | Jannette et al. ............. 455/560 |
| 2003/0002476 A1 | 1/2003 | Chung et al. |
| 2003/0051195 A1 | 3/2003 | Bosa et al. |
| 2003/0065741 A1 | 4/2003 | Vo |
| 2003/0074576 A1 | 4/2003 | Kelly |
| 2004/0030752 A1 | 2/2004 | Selgas et al. |

* cited by examiner

RESOURCE AND AAA SERVICE DEVICE

CROSS REFERENCE TO RELATED APPLICATIONS

This application is being filed with the related, co-pending applications as set forth below:

U.S. patent application Ser. No. 10/104,816 entitled "VOICE AND DIAL SERVICE LEVEL AGREEMENT ENFORCEMENT ON UNIVERSAL GATEWAY," filed on Mar. 22, 2002

U.S. patent application Ser. No. 10/10/104,819 entitled "SEGREGATING SERVICE LEVEL AGREEMENTS ACROSS LARGE-SCALE NETWORKS" filed on Mar. 22, 2002

U.S. patent application Ser. No. 10/104,820 entitled "EXPEDITING PORT RELEASE IN DISTRIBUTED NETWORKS" filed on Mar. 22, 2002

U.S. patent application Ser. No. 10/104,299 entitled "SHARING GATEWAY RESOURCES ACROSS MULTI-POP NETWORKS" filed on Mar. 22, 2002

BACKGROUND

1. Field

This disclosure relates to network devices, more particularly to network devices in used for authentication, authorization or accounting (AAA) and other administrative functions.

2. Background

Many networks use AAA servers to control access and accounting for network use. For example, a wholesale network provider that owns the physical network of wires and cables sells time on the network to an Internet service provider (ISP). Generally, there is an agreement between the wholesaler and the ISP that governs how many calls per a given time period, such as calls per second, that ISP gets for a particular level of service. The parameters of this agreement are typically contained in a service level agreement (SLA).

However, many SLAs are not enforced or are not enforced consistently. This leaves the wholesaler in the position of having to buy or lease extra equipment to handle the maximum call traffic, or fail to meet their obligations to one customer when another customer exceeds their SLA. As a solution to this, many wholesalers and ISPs use single point solution to provide an AAA server, enforce port policy management (such as the number of ports allowed for a given endpoint), as well as handle the routing of the incoming calls. An example of this type of network configuration is shown in FIG. 1.

As can be seen in FIG. 1, the wholesale network AAA server 10 is accessed by equipment at several points-of-presence (POP), 12a-12n. This server then routes the AAA information to the various ISP AAA servers 14a-14n, as well as routing the incoming call. This single-point solution allows one network device, such as a server, to coordinate the port policy enforcement, enforce SLAs, and to provide AAA information to the correct data.

In current implementations, basic dial-up AAA administrative messages may be switched by an AAA proxy server. They act as a 'proxy' for the AAA servers, receiving AAA messages intended for more than one AAA server. The proxy server then routes the AAA message to the appropriate server.

However, as can be seen in FIG. 1, this single-point of either an AAA server or an AAA proxy server becomes a choke point in the network. If the system uses other resource management servers, these contribute to the traffic backlog at these single point implementations. This is further complicated as high-bandwidth-requirement services are desired, such as the ability to place voice calls over data networks as in Voice Over Internet Protocol (VoIP) services.

VoIP, and similar voice services, may place a strain on the network if managed poorly. Many providers set out their service levels for voice versus data calls in their SLAs. This makes the enforcement of these agreements even more critical. Similarly, the high-bandwidth requirements of these types of services consume network resources, contributing to the network delays that may occur at the AAA servers.

It would be useful to have a method and apparatus that could separate the various enforcement issues, such as AAA, port policy enforcement and SLA management, from the routing of the traffic itself.

SUMMARY

One embodiment is a network device. The network device includes a gateway switch to receive an incoming call and to identify a source of the call. A parser then receives a request associated with the incoming call and produces a parsed request. A message parser within the parser receives the request depending upon the source of the call. A policy switch then receives the parsed message and transmits the request to a policy processor based upon the parsed message.

Another embodiment of the invention is a method of providing service routing. The method includes receiving an incoming call from a point-of-presence (POP) and then parsing a message request from the incoming call. The parsed message request is then used to associate the call with a service level agreement and the administrative data about the call is transmitted to a policy processor.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
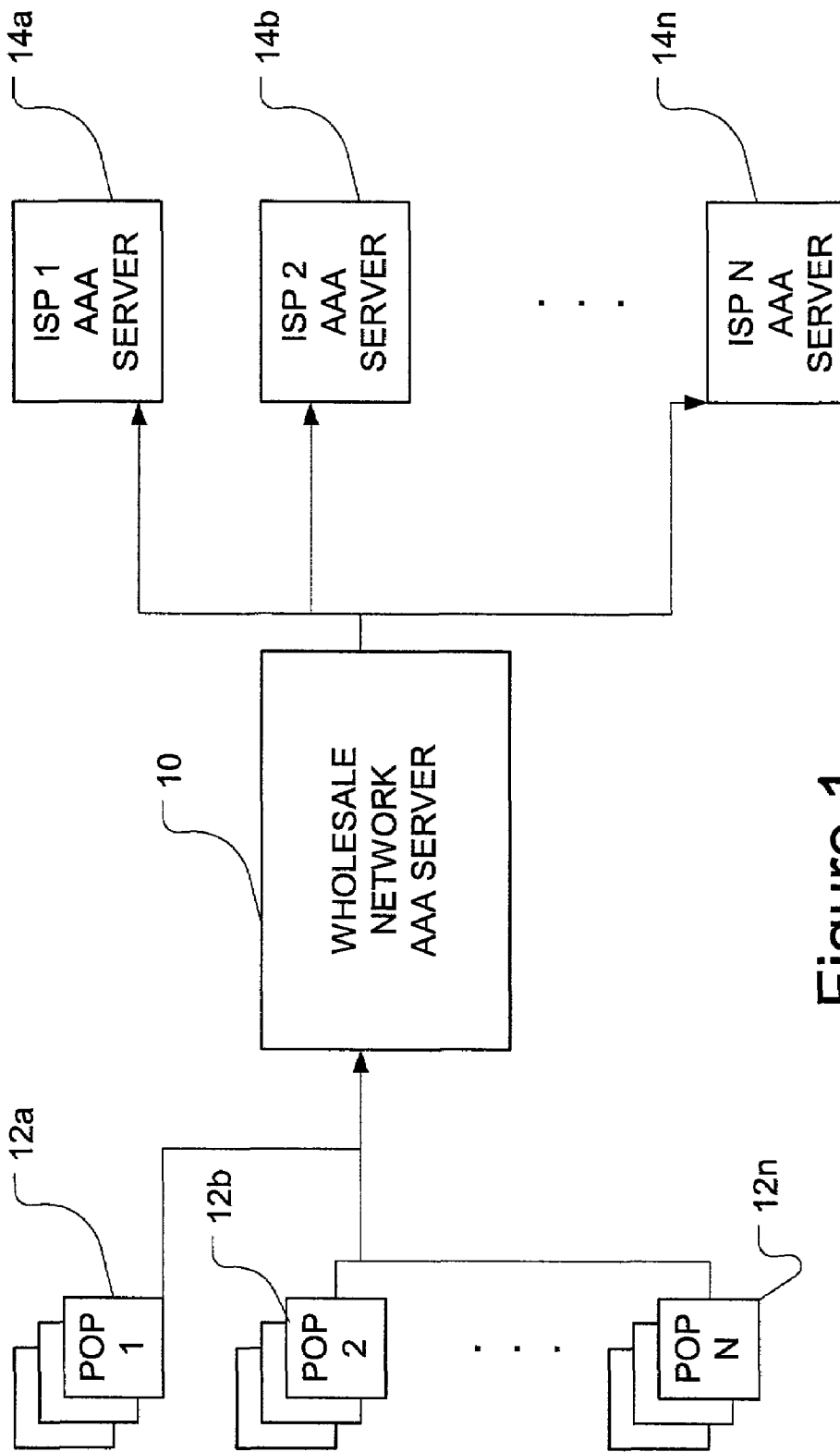
FIG. 1 shows an embodiment of a network having an authentication, authorization and accounting server, in accordance with the prior art.
Figure 2:
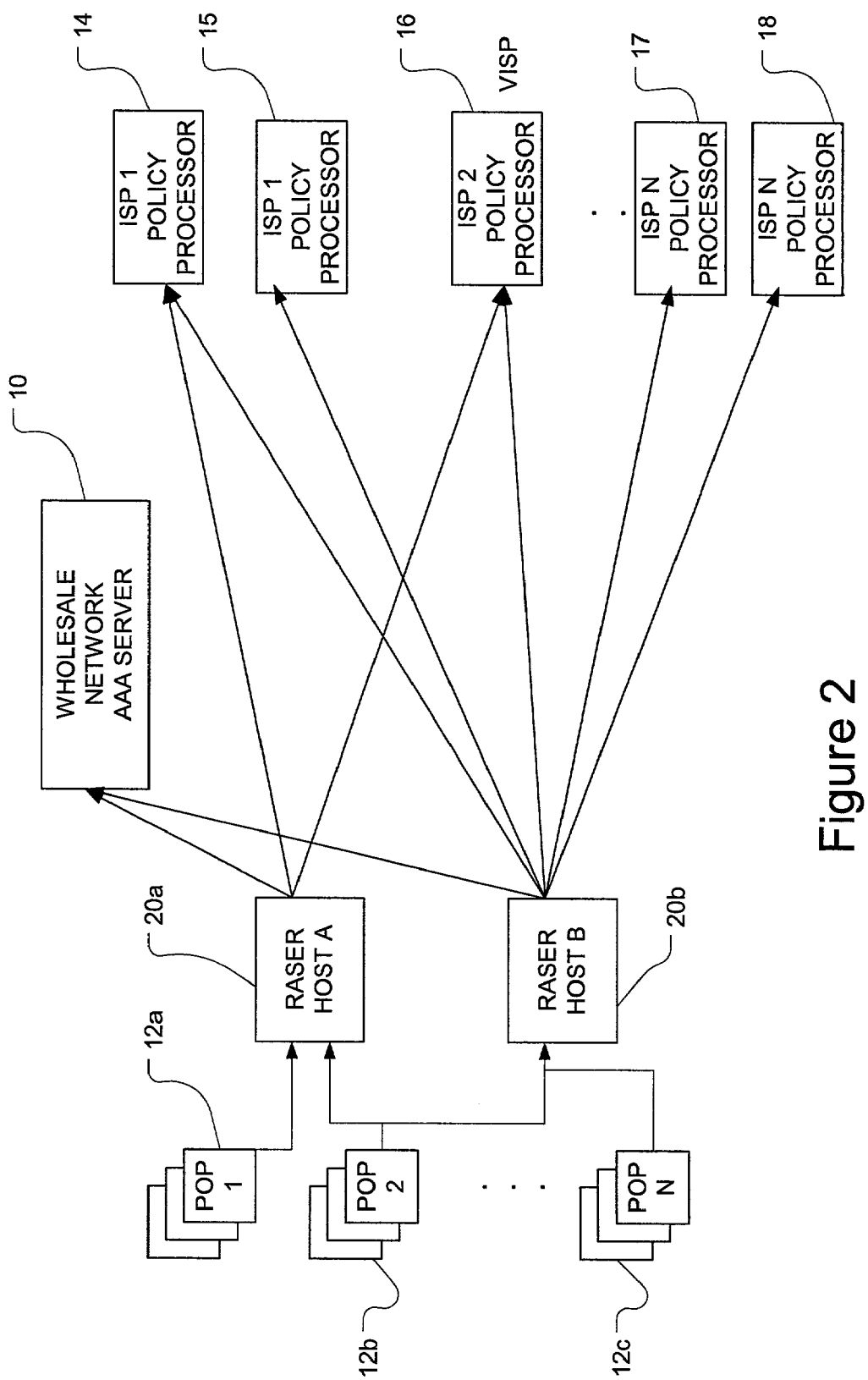
FIG. 2 shows an embodiment of a network having a resource and authentication, authorization and accounting service device, in accordance with the invention.

FIG. 2 shows an embodiment of a network including Resource and AAA SERvice (RASER) devices, in accordance with the invention. In this particular depiction, the other components of a network have been removed from the drawing to allow better understanding of the invention. The endpoints of the network, referred to here as points-of-presence (POPs), communicate their respective AAA data, as well as other resource and port management data, to the Resource and AAA SERvice devices (RASER) 20a and 20b. The AAA resource and port data will be referred to here as administrative data.

Generally, RASERs have many more capabilities and are far more flexible than current solutions, such as AAA proxy servers. RASERS are multi-protocol controllers and can communicate with several different types of network devices in a point-of-presence (POP). RASERs are also multi-service level and can parse incoming messages and identify which particular policy should be applied, such as AAA, service level agreement (SLA), resource management or port policy. The RASER routes the administrative data to the appropriate policy processor, where the term policy processor may include AAA servers, SLA servers, and port policy managers. Port policy managers manage the port policies, as will be discussed with reference to FIG. 3, and may referred to as POP managers.

In addition to their ability to manage the administrative data, routing it to the appropriate policy processor, RASERs can also receive messages. For example, RASER Host A may route the administrative message to one policy processor for an ISP, such as ISP1 Policy Processor 14. That policy processor 14 may then send the results back to the RASER Host A, which then forwards the results to ISP1 Policy Processor 15. Finally, the RASER may route the results of that interaction back to the originating network device, such as POP1 12a. The RASER will generally not be involved in the actual policy decisions, but may identify the necessary decision makers that need to be involved.

The network may include several RASER devices, not just the two shown here. The routing to the RASERs may be done in several ways. For example, the Universal Gateway through which the POPs communicate with the network may send the requests to one of several RASERs based upon a round-robin rotation, to each RASER in turn. Alternatively, the gateway could assign a primary RASER for each POP, with a secondary in case the primary is backlogged beyond a certain point. Additionally, the incoming device may not be a universal gateway sending dial-up information, but could be a voice gatekeeper (GK) sending GKTMP information, such as for a VoIP call under H.323.

As can be seen in FIG. 2, POP1 and POP2 communicate with RASER host 20a. The RASER then sends the appropriate data to the appropriate server. Data related to the wholesale network AAA requirements is sent to the Wholesale Network AAA Server 10. Data related to the individual Internet Service Providers (ISP) is sent to the appropriate ISP AAA, or SLA (service level agreement) server. In this particular case, ISP 2 18 is a Voice ISP. Note that the term 'Internet' as used here is merely an example of a network with which most users are familiar. The ISPs may be generic network service providers as well. The SLA servers and AAA servers are particular types of policy processors as that term as used here.

For example, assume a user accesses the network using a dial in from a personal computer through ISP1. The server into which the user dialed is the POP. The ISP1 has a leasing agreement for a certain number of calls per second on a wholesale network owned by Wholesaler. The information related to the use of the Wholesaler's network, that ISP1 is using the network, is routed to the Wholesale AAA server. AAA servers in general are focused on security. One of their primary functions is to ensure that the user name and the password match for logging in operations. The Wholesale AAA server generally routes the necessary information to the ISP AAA server.

Other types of servers may also perform functions on this network, such as port policy enforcement. For example, "this POP may not have more than 40% of its traffic mix be voice traffic at this time of day." The traffic mix is the percentage of voice and percentage of data traffic for a particular POP. Another example of port policy management may be "this POP has 2000 overflow ports used first-come-first-serve." These global port policies may be governed by one of the described network devices, such as the Wholesale AAA server, the ISP1 AAA server or the ISP1 SLA server, or another policy processor, not shown. Another policy processor type, referred to here as a POP manager, enforces port policy agreements as well as performs other functions.

The RASER devices isolate this type of administrative function from the routing of the actual call. This reduces the overhead processing at the POPs and allows the network to isolate the traffic routing from the administrative routing of AAA, SLA and port policy data. The RASERs do not have to be reconfigured until there is a change in the network topology, such as the addition of a new ISP. Currently, every time an SLA is changed or new devices are added to the network, the AAA servers have to be reconfigured.

An additional aspect of this implementation is the applicability to adapt for 'any service any port (ASAP)' networks. The port policies and SLAs for these type of networks can be complicated and contribute to poor network performance. The use of RASERs alleviates this problem. Similarly, in large universal port (UP) networks, administrators can enforce global customer SLAs across several POPs while also enforcing POP service ratios.

Figure 3:
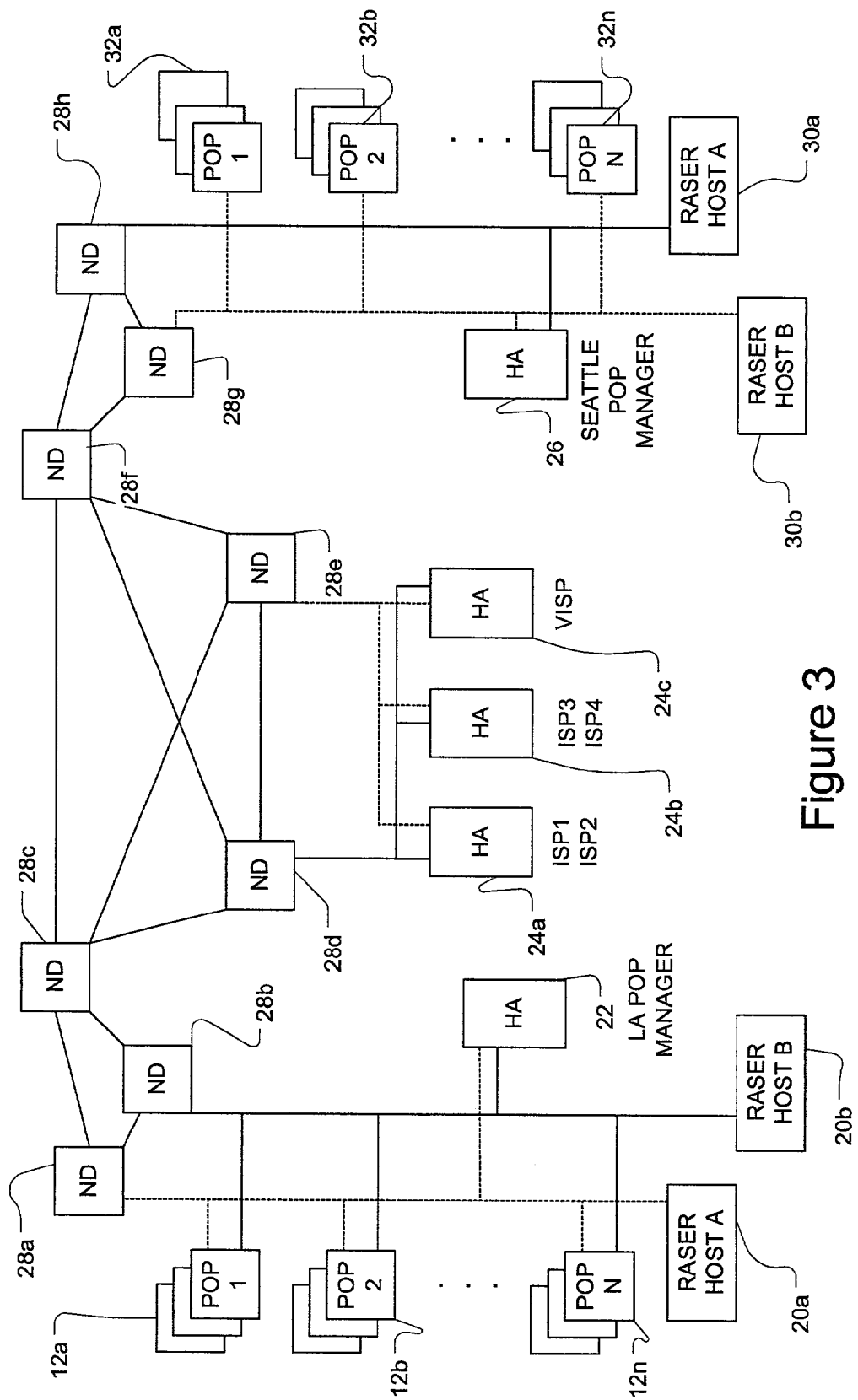
FIG. 3 shows an embodiment of a wide-area network employing RASER devices, in accordance with the invention.

Having viewed just the administrative routing for a network employing RASER devices, it is useful to see an entire network including the RASERs. This is shown in FIG. 3. This diagram shows two 'ends' of a network. At one end of the overall network is a smaller network, with POPs 12a-12n, two RASER hosts 20a and 20b, and an SLA server 22. The SLA server is designated as HA 'High Availability.' Typically, this may involve dual servers that remain in sync. However, high availability is not a requirement. This 'end' of the network then connects to the main network through the network devices 28a-28h.

As part of the network, a set of policy processors, which may also include AAA servers, for each ISP including VISPs is established at 24a-c. These policy processors govern the POP agreements, enforce the SLAs, handle the AAA data, etc. They are in communication with the RASERs through the network, with the RASERs sending the administrative data related to these tasks apart from the data traffic. The other 'end' of the network is a similar configuration as the other end. POPs 32a-32n communicate with SLA processor 26, and include RASERs 30a and 30b.

If the network were to have one 'end' in Los Angeles (LA) and the other in Seattle, for example, the following series of events may occur. This example is intended only for understanding of the invention and is no way intended to limit application of the invention or its scope. In the following example, an incoming call from LA will need to be managed. LA RASER Host 20a receives a request from POP1 12a. RASER 20a sends the request to the ISP1 policy processor 24a. In this particular instance the ISP1 policy processor 24a is an SLA processor. The policy processor 24a observes that there are already 65,000 regular active calls, 35,000 is LA and 30,000 in Seattle. The policy processor 24a is authorized to attempt to connect an additional 10,000 calls on best effort. Currently, there are only 2,000 excess calls, so the ISP1 policy processor is then authorized to attempt a call connection.

ISP1 policy processor 24a then sends a 'best effort' message to the RASER host 20a. RASER host 20a then sends a 'chain of command' message to the LA POP manager 22. The LA POP manager 22 has a limit of 7,000 users and notes that there are only 6,500 excess active calls. The POP manager 22 then accepts the call and sends a call accept message to the RASER host 20a. The RASER host 20a then sends a connect message to the user through the POP1 12a.

Upon receipt of the connect message, the user then enters the user name and password, which is sent to the POP1 12a. POP1 12a then sends the AAA message to the RASER host 20a. The RASER then matches the user name to the ISP1 AAA server and sends the information. The AAA information is either routed to the ISP 1 AAA directly from the RASER, or a LA AAA server routes the information to the appropriate ISP upon receipt of the user name information.

In this particular example, the LA AAA server is equivalent to the Wholesale AAA server. For legacy or other reasons, it may be preferable to route the AAA information to the Wholesale AAA server rather than directly to the AAA server for the ISP. Generally, in embodiments similar to the above example, the RASER host, POP manager, ISP1 SLA server, the LA AAA server (not shown) and the POP1 devices would be owned by the wholesale network provider, and the ISP1 AAA server is owned by the ISP.

Figure 4:
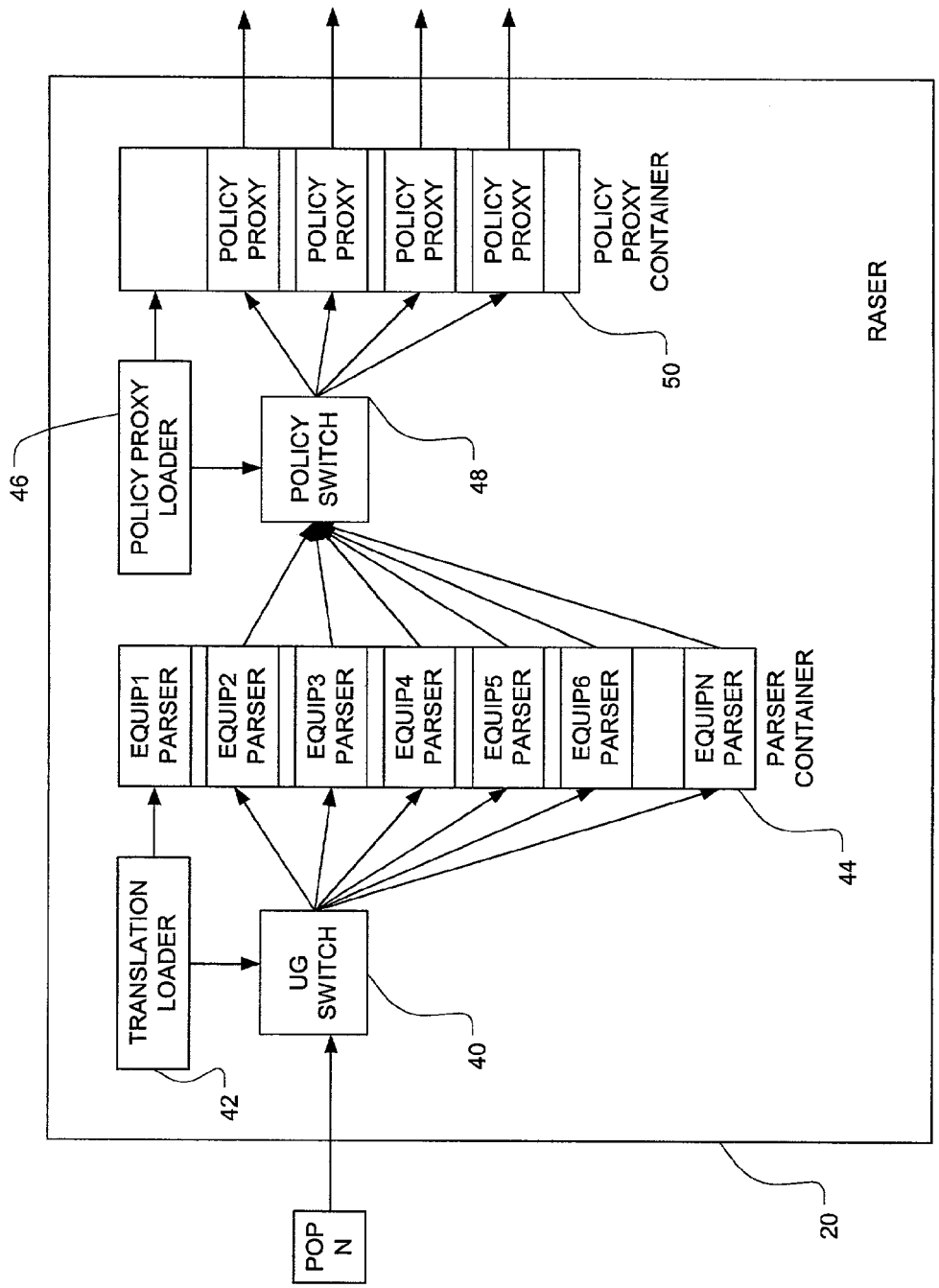
FIG. 4 shows an embodiment of a RASER network device, in accordance with the invention.

The RASERs may be any network device, including workstations, routers, servers, etc. Generally, the RASER will comprise a network device executing machine-readable code, where the machine is the router, workstation, etc. The machine-readable code, when executed, causes the machine to perform the methods of the invention. An example of a RASER device is shown in FIG. 4.

The RASER 20 includes a universal gateway switch 40. The UG switch 40 is configured to associate a hardware specific parser based upon the address of the message source. For example, if the RASER were operating under Internet Protocol (IP), the UG switch would decode the IP address of the message source and identify the hardware at that address. Examples include Lucent-manufactured equipment, Cisco-manufactured equipment, and Northern Telecom-manufactured equipment. The UG switch 40 then sends the message request to the appropriate equipment parser in the parser container 44.

The equipment parser then parses the message request into a format that can be used by the policy switch 48. The policy switch 48 then associates the call with the appropriate policy, such as a service level agreement or port enforcement policy and then routes the message to the appropriate policy processor, which may be an SLA server, an AAA server, or other policy processor. The message request is transmitted to the appropriate proxy in the proxy container 50, which then communicates with the appropriate policy processor. In this manner, the RASER transmits the appropriate administrative data to the appropriate policy processor. The administrative data may include calls per second at a particular POP as well as any of the parameters discussed here.

The network device configured as a RASER may also include a translation loader. It provides the necessary information to UG switch to allow the device to identify the incoming call by its access identification, whether that be username, DNIS, call type, trunk group from the universal gateway IP/Slot/Port, or even the phone number, as examples. It may also include information that identifies the equipment as voice over data networks equipment, such as a VoIP phone. Similarly, the policy switch 48 may be loaded with the necessary proxying information by the policy proxy loader 46. When the device needs to be reconfigure or updated, it is the information in these loaders that is updated.

As mentioned previously, the UG switch may communicate with many different types of devices of many different protocols. The incoming request may be sent via a universal gateway sending remote authentication dial-in user services (RADIUS), a voice gatekeeper sending GKTMP information, etc. The translation and proxy loader allow this flexibility. New protocol translators and new policy 'chain of command' work flows can be loaded into the device.

In this manner, routing services can be separated from other processing on call traffic. As a network needs to be scaled, the addition or subtraction of RASERs makes the scaling easier and more flexible. The use of RASERs allows service and policy based routing and data transmission available for wholesale networks.

Thus, although there has been described to this point a particular embodiment for a method and apparatus for resource and AAA services routing, it is not intended that such specific references be considered as limitations upon the scope of this invention except in-so-far as set forth in the following claims.

What is claimed is:

1. A network device, comprising:
    a universal gateway switch to receive an incoming call, decode a network address to identify a source of the call and to identify equipment by manufacturer located at the source;
    an equipment parser operable to receive a request to establish the incoming call and to produce a parsed request, wherein a message parser within the parser receives the request dependent upon the manufacturer of the equipment located at the source of the call; and
    a policy switch operable to receive the parsed request and to transmit the request to a policy processor based upon the parsed message.

2. The network device of claim 1, wherein the device further comprises a translation loader.

3. The network device of claim 1, wherein the device further comprises a policy processor proxy loader.

4. The network device of claim 1, wherein the gateway switch is also operable to identify if the source of the call is a voice connection.

5. The network device of claim 1, wherein the network device further comprises a router.

6. The network device of claim 1, wherein the network device further comprise a server.

7. A method of providing service routing, the method comprising:
    receiving an incoming call from a point-of-presence;
    decoding a network address to identify equipment by manufacturer located at the point-of-presence;
    associating an appropriate parser based upon the manufacturer of the equipment;
    parsing a message request to establish the incoming call using the appropriate parser;
    associating the call with a service level agreement; and
    transmitting administrative data about the call to a policy processor.

8. The method of claim 7, wherein associating the call further comprises identifying at least one parameter from the group comprised of: user name, call type, trunk group, and domain name information service.

9. The method of claim 7, wherein the administrative data further comprises an Internet Service Provider name.

10. The method of claim 7, wherein the administrative data further comprises a current number of calls for the point-of-presence.

11. The method of claim 10, wherein the administrative data includes traffic mix data.

12. A network device, comprising:
- a means for receiving an incoming call and to decode a network address to identify equipment by manufacturer located at a source of the call;
- a means for receiving a request to establish the incoming call and to produce a parsed request, wherein a message parser within the parser receives the request dependent upon the manufacturer of the equipment located at source of the call; and
- a means for receiving the parsed request and to transmit the parsed request to a policy processor based upon the parsed message.

13. The network device of claim 12, wherein the network device further comprises means for loading translation data.

14. The network device of claim 12, wherein the network device further comprises means for loading policy processor proxy data.

15. The network device of claim 12, wherein the means for receiving an incoming call further comprises a gateway switch.

16. The network device of claim 12, wherein the means for receiving a request associated with the incoming call further comprises a parser.

17. The network device of claim 12, wherein the means for receiving the parsed request further comprises a policy processor switch.

18. An article containing machine-readable code that, when executed, cause the machine to:
- receive an incoming call from a point-of-presence;
- decode a network address to identify equipment by manufacturer located at the point-of-presence;
- associating an appropriate parser with the equipment based upon the manufacturer;
- parsing a message request to establish the incoming call using the appropriate parser;
- associate the call with a service level agreement;
- transmit association data about the call to a service level agreement processor;
- transmit point-of-presence data to a policy processor; and
- route the call.

19. The article of claim 18, wherein the machine further comprises a router.

20. The article of claim 18, wherein the machine further comprises a server.

* * * * *